United States Patent [19]

Furuno

[11] 4,015,153
[45] Mar. 29, 1977

[54] SMALL SYNCHRONOUS MOTOR WITH LASH COUPLING

[76] Inventor: Sentaro Furuno, 22-16, Kami-Igusa, 2-chome, Suginami, Tokyo, Japan

[22] Filed: June 19, 1975

[21] Appl. No.: 588,462

Related U.S. Application Data

[63] Continuation-in-part of Ser. No. 531,347, Dec. 10, 1974, abandoned, which is a continuation of Ser. No. 361,627, May 18, 1973, abandoned.

[30] Foreign Application Priority Data

May 29, 1972 Japan .............................. 47-53110

[52] U.S. Cl. ................................................. 310/41
[51] Int. Cl.$^2$ ........................................ H02K 7/10
[58] Field of Search ............... 310/41, 46, 67, 116, 310/117, 162, 164, 165, 154, 257; 818/136

[56] References Cited

UNITED STATES PATENTS

| | | | |
|---|---|---|---|
| 1,976,880 | 10/1934 | Graseby | 310/162 X |
| 2,673,939 | 3/1954 | Tetro | 310/164 UX |
| 2,973,687 | 2/1961 | Kohler | 310/41 |
| 3,231,770 | 1/1966 | Hyde | 310/41 X |
| 3,403,273 | 9/1968 | Higuchi | 310/41 |
| 3,427,485 | 2/1969 | Dotto | 310/41 X |
| 3,558,940 | 1/1971 | Chestnut | 310/257 X |
| 3,719,842 | 3/1973 | Kuntz | 310/41 X |

Primary Examiner—Mark O. Budd

[57] ABSTRACT

A small synchronous motor in which a rotor is rotatably mounted on its output shaft in such a manner that the rotor is rotatable through a predetermined angle around and relative to the output shaft. A torque transmitting mechanism for transmitting the torque of the rotor is turned to the output shaft whereby, upon application of alternating current to the motor, only the rotor is first turned to its synchronous speed under no load, and the output shaft is then rotated by means of the torque transmitting mechanism after the rotor has been synchronized while turning through that predetermined angle around the output shaft.

1 Claim, 7 Drawing Figures

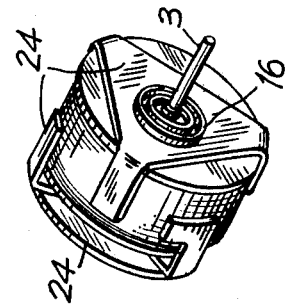
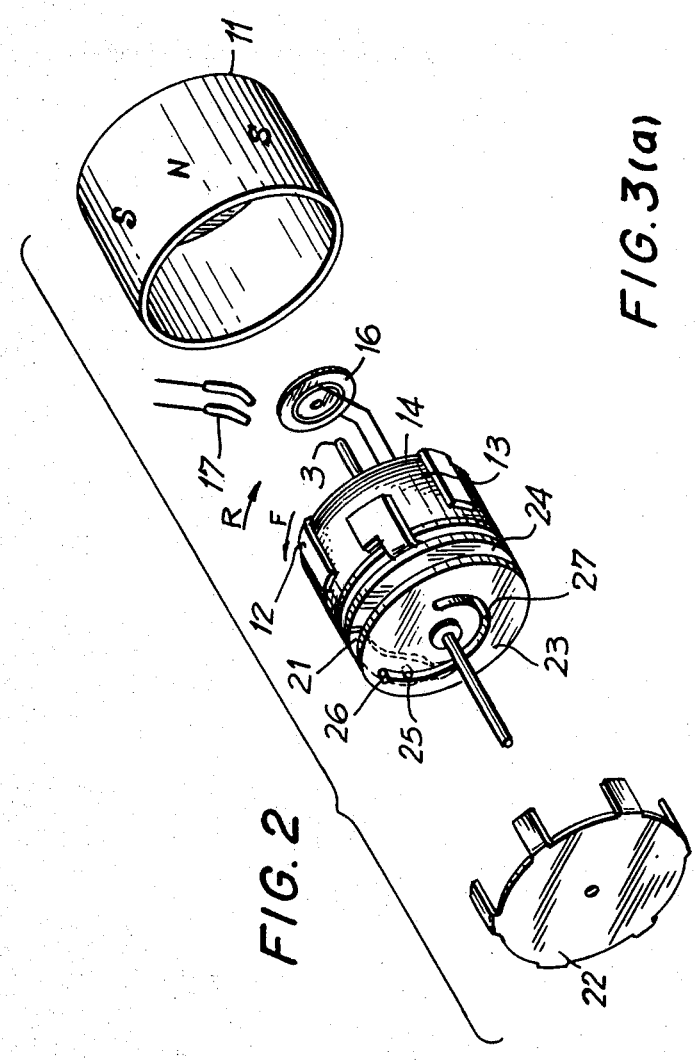

SMALL SYNCHRONOUS MOTOR WITH LASH COUPLING

The present application is a continuation-in-part of the parent application Ser. No. 531,347, filed Dec. 18, 1974; which is a continuation of Ser. No. 361,627, filed May 18, 1973 both now abandoned.

BACKGROUND OF THE INVENTION

This invention relates to small synchronous motors and more particularly to small synchronous motors which can start in a short period of time at the frequency of a commercial power source.

The term "small motors" as herein used, is intended to designate motors of the character described below. One typical example of such a motor is one having a housing diameter of the order of 50 mm. and a housing length of the order of 60 mm.

Electric motors which are small in size and run at a constant rotational speed have been in demand and used for devices such as tape recorders and record players. In order to satisfy this demand an alternating current electric motor, for instance, an electric motor of shading coil type which can rotate at a constant synchronous speed has been employed for tape recorders, record players and the like.

However, the electric motor of this type has a small starting torque. Therefore, even in the case where a light load such as a turntable is applied to the motor, the motor takes several seconds before it reaches a predetermined or required speed. Thus, the starting operation of the motor cannot be accomplished within a short period of time. Furthermore, in order to increase the starting torque of the motor, it is necessary to make the size of the motor greater.

While, on the other hand, the employment of a DC machine would provide a greater starting torque, an intricate servo-control-system must be provided in order to hold constant the speed of the DC machine after the starting operation thereof.

SUMMARY OF THE INVENTION

Accordingly, it is a primary object of this invention to eliminate all of the above-described drawbacks accompanying a conventional small electric motor for a tape recorder, a record player and the like.

More specifically, an object of the invention is to provide a small synchronous motor which can be driven by a commercial power source having a stable frequency and starts in a very short period of time.

Another object of the invention is to provide a small synchronous motor in which a substantially large torque can be produced at a rated speed from the starting of rotation of its output shaft, although the synchronous motor is small in size.

A further object of the invention is to provide a small synchronous motor which is simple in construction and is low in cost.

According to this invention, briefly summarized, there is provided a small synchronous motor comprising: an output shaft; a rotor mounted on the output shaft in a manner whereby the rotor is rotatable through a predetermined angle around and relative to the output shaft; and a torque transmitting mechanism for transmitting torque from the rotor to the output shaft, the synchronous motor being started upon supplying of electric power thereto, first, by a rotation of the rotor to its synchronous speed under no load and, then, a rotation of the output shaft by the torque thus transmitted from the rotor by the torque transmitting mechanism.

The manner in which the foregoing objects and other objects are achieved by this invention will become more apparent from the following detailed description and the appended claims when read in conjunction with the accompanying drawings, in which like parts are designated by like reference numerals.

BRIEF DESCRIPTION OF THE DRAWINGS

In the drawings:

FIG. 2 is an axially exploded perspective view of a locking member, a rotor and a stator of the motor shown in FIG. 1;

FIGS. 3(a) and 3(b) are perspective views of the rotor, showing both ends thereof, respectively;

DETAILED DESCRIPTION OF THE INVENTION

Figure 1:
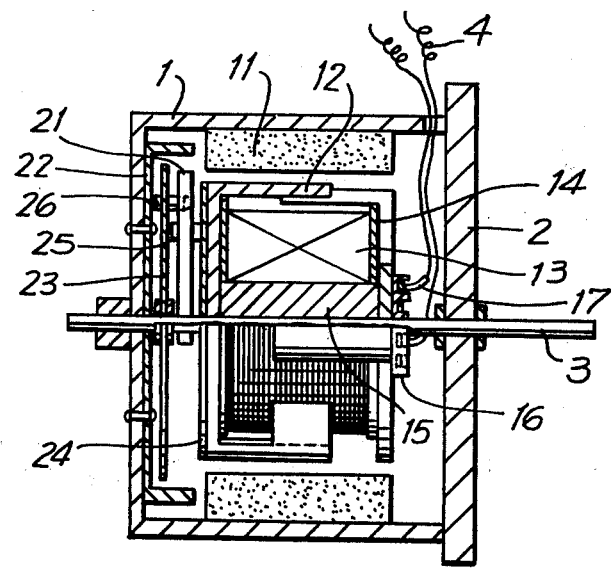
FIG. 1 is a longitudinal sectional view of one example of the small synchronous motor of this invention, with its upper half completely sectioned and with its lower half partially sectioned.

With reference to FIG. 1, there is shown one preferred example of the small synchronous motor according to this invention which comprises: a housing 1; a housing base 2 fixedly secured to the housing 1; an output shaft 3 of the synchronous motor; power supply wires 4; a stator 11 provided on the inner surface of the housing 1, the stator 11 having permanent magnets which have been equally magnetized as shown in FIG. 2 (the magnetic poles of the stator 11 being referred to hereinafter as "stator magnetic poles" 11); and a rotor.

The rotor is provided with: pole members having comb-tooth-shaped magnetic poles 12 (hereinafter referred to as rotor magnetic poles 12) which are arranged in correspondence with the stator magnetic poles 11, the pole members being opposed to each other; a coil 13 for exciting the rotor magnetic poles 12; a bobbin for winding the coil 13; a magnetic path member 15 for forming magnetic paths between the rotor magnetic poles 12; slip rings 16 provided on one end of the rotor for feeding electric current to the coil 13 through brushes 17 respectively connected to the electric power wires 4; and a side plate 24 provided on the other end of the rotor.

The synchronous motor further comprises: an engaging pawl 21 made of a soft elastic material such as polyurethane, the engaging pawl 21 being pivotally supported by a pivot 25 on a relatively peripheral portion of the side plate 24; a locking member 22 for engaging with the engaging pawl 21 in order to prevent reverse rotation of the rotor; and a torque transmitting plate 23 for transmitting torque which is caused only when the rotor is rotated forwardly by the engagement of the plate 23 with a perpendicular pin 26 imbeddedly fixed to the engaging pawl 21, the torque transmitting plate 23 being fixedly mounted on the output shaft 3.

FIG. 2 illustrates the locking member 22, the rotor, the slip ring 16, the brushes 17 and the stator 11 which are shown in axially exploded state. FIGS. 3(a) and 3(b) are perspective views of the rotor.

In the example shown in FIGS. 2, 3(a) and 3(b), the stator 11 has six magnetic poles which are equally arranged. Accordingly, the number of the rotor magnetic poles 12 is also six. One of the rotor magnetic poles 12 is different in shape from the others, that is, it has a protruded portion for the purpose of facilitating the motor starting operation, so that the pole pitch between only one pair of poles is shorter. Since electric current is supplied to the rotor through the slip rings 16 and the brushes 17 from the commercial power source, the rotor encounters only a very small mechanical resistance due to the slip rings and the brushes.

When the perpendicular pin 26 of the engaging pawl 21 pivotally supported on the side plate 24 is engaged with the torque transmitting plate 23 fixedly mounted on the output shaft 3, the rotor imparts its torque to the output shaft B. More specifically, the torque transmitting plate 23 is provided with a helical guide slot 27 for engaging with the pin 26. When the pin 26 is locked at an end of the helical guide slot 26 with the rotation of the rotor, the output shaft 3 is rotated. The direction of the torque imparted to the output shaft 3 is controlled to be only one direction as will be described later.

The operation of the small synchronous motor of the above described structure according to the invention is as follows:

Upon application of alternating current to the rotor, it rotates either in the forward direction F or in the reverse direction R (FIG. 2).

First, the case where the rotor is rotated in the reverse direction R will be described. Since the rotor is rotatably mounted on the output shaft, first only the rotor is turned upon application of alternating current, but the output shaft 3 and the torque transmitting plate 23 remain stationary. Thus, the rotor turns with no load.

As the rotor is turned through approximately one revolution as a maximum, the perpendicular pin 26 of the engaging pawl 21 slides along the guide slot 27 of the torque transmitting plate 23 and finally abuts against the outer end of the guide slot 27, while one end of the engaging pawl 21 protrudes from the periphery of the side plate 24 and the other end of the engaging pawl 21 engages with the output shaft 3.

As a result, the torque of the rotor is transmitted to the output shaft 3, which is thereby urged to rotate the output shaft 3. In this case, however, the rotation of the output shaft causes the end of the engaging pawl protruded from the periphery of the side plate 24 to be engaged with the locking member 22. As a result, the rotation of the rotor is stopped and the rotor is turned in the direction opposite the reverse direction R, that is, in the forward direction F, by the elastic repulsion of the engaging pawl 21.

Thus, the rotor is turned again with no load in the forward direction F, but in this operation the output shaft 3 is not turned. After approximately one revolution of the rotor in the forward direction F, the perpendicular pin 26 of the engaging pawl 21 engages the inner end of the guide slot 27, while the end of the engaging pawl 21 is retracted inside the periphery of the side plate 24.

As a result, the torque of the rotor is transmitted to the output shaft 3, and thereafter the output shaft 3 is rotated in the forward direction F.

The synchronous rotation of the rotor is attained before the torque of the rotor is transmitted to the output shaft 3. Therefore, the output shaft 3 starts its rotation with a substantially large torque. This output torque is of the order of approximately 80% of the pull-out torque of the synchronous motor.

Now, the case where the rotor is rotated in the forward direction F by the application of the alternating current will be described.

In this case, no action occurs between the engaging pawl 21 and the locking member 22, and a great torque is quickly applied to the output shaft 3. If the perpendicular pin 26 of the engaging pawl 21 is engaged with the torque transmitting plate 23 only at the inner end of the guide slot 27, the output shaft 3 continues its rotation even after the rotor has stopped because a load applied to the output shaft 3 has some momentum. In this case, the rotation of the output shaft 3 is stopped when the pin 26 reaches the outer end of the guide slot 27.

Thus, the starting operation of the rotor is carried out with no load, and when the synchronous operation of the rotor is attained, the output shaft 3 is rotated.

Figure 4:
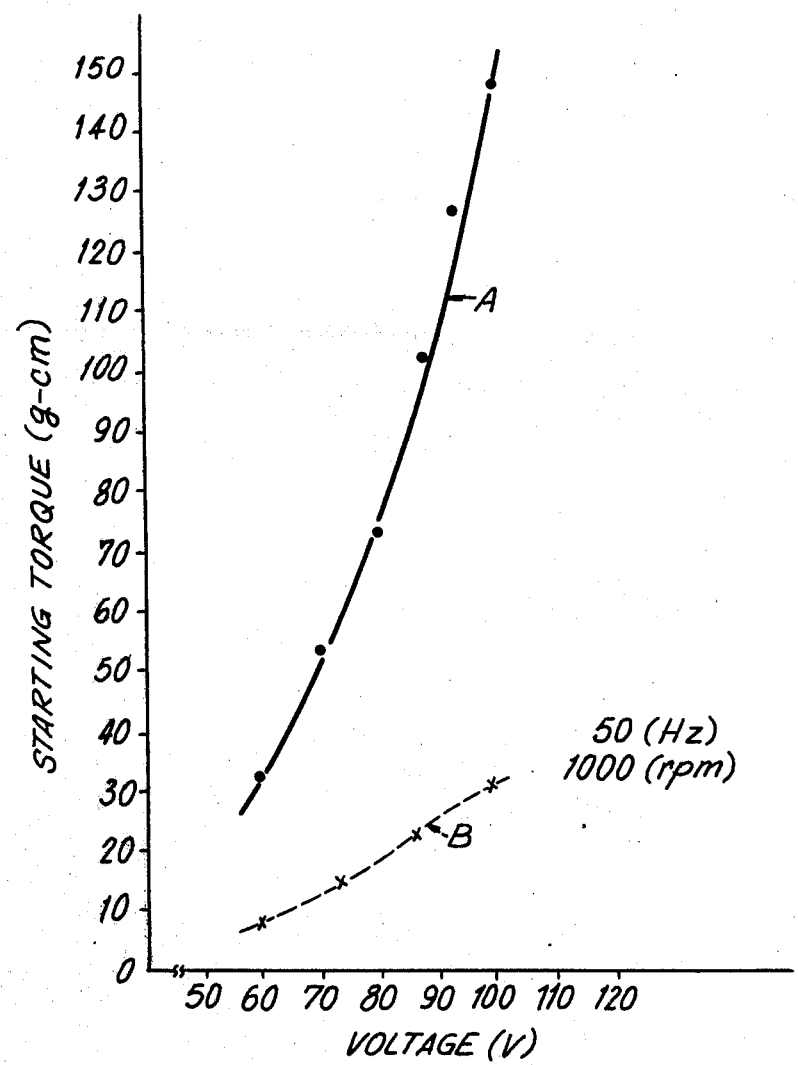
FIG. 4 is a graphical representation indicating starting torques of the small synchronous motor of the invention and those of a conventional electric motor employed in, for instance, an electric clock at various supply voltages applied thereto.

FIG. 4 is a graphical representation illustrating torques of the small synchronous motor of the invention and those of a conventional electric motor employed for, for instance, an electric clock at various supply voltages applied thereto.

As is indicated by a solid line A in FIG. 4, the synchronous motor of the invention can produce a great output torque of more than 140 g-cm at the rated voltage 100V. Thus, the performance of the motor of the invention is superior to that of the conventional electric motor whose output torque is indicated by an intermittent line B in FIG. 4.

Figure 5:
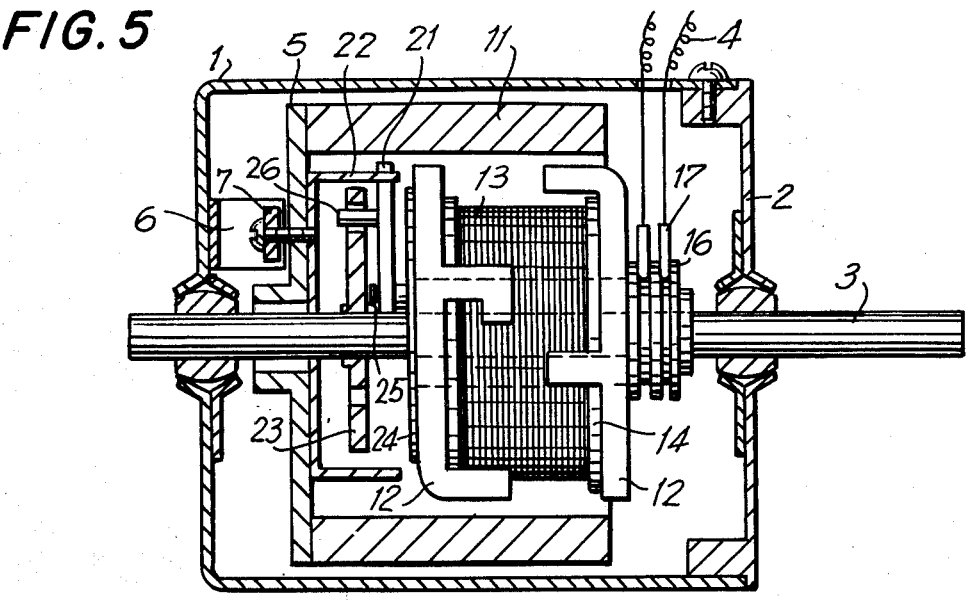
FIG. 5 is a longitudinal sectional view of another example of the synchronous motor of the present invention.
Figure 6:
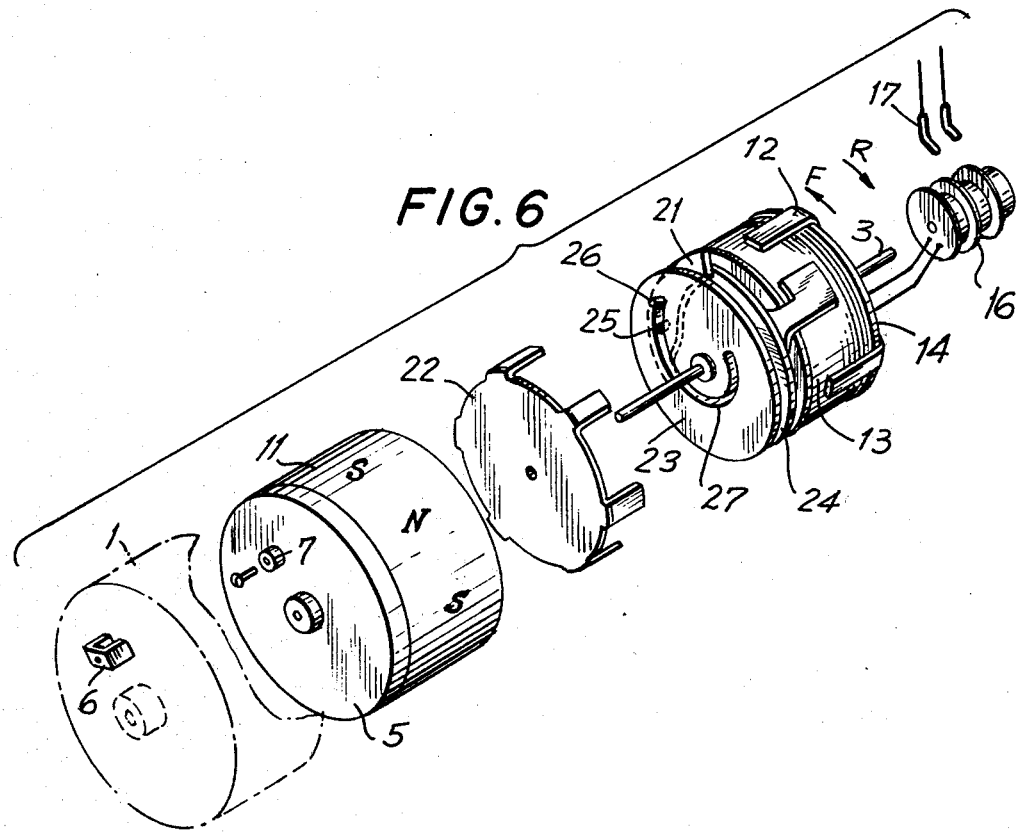
FIG. 6 is an axially exploded perspective view of the various elements shown in FIG. 5.

In the case where a turntable of a record player is employed as a load of the motor, the starting torque described above is sufficient to rotate the turntable. In addition, the starting period of time of the motor is much less than the rated value of 0.5 second, and the motor stops its rotation within a very short time or substantially instantaneously due to the characteristic of the synchronous motor. In the example shown in FIG. 5, a stator is rotatable only within the small angle mounted on the inner side of the housing 1. In particular, a supporting member 5 provided with a stator magnet 11 has a knob 7 which can rotate against the housing and engage with a stroke-limiting member 6 such as a U-shape member attached to the housing 1. Moreover, the supporting member 5 has an engaging member 22 which is capable of engaging with an engaging pawl 21 pivoted on a side plate 24 of the rotor and prevents the rotor from the reverse rotation. The apparatus in FIG. 5 operates in the same manner as that shown in FIG. 1, but in order to improve the relative motion between the stator and the rotor due to magnetic action, it is constructed so as to have such a relation that the stator can rotate relatively against the housing within a predetermined small angle, and so that both the rotor and the output shaft can rotate relative to each other. Accordingly, the rotor is driven in an initial condition extremely close to no-load condition. With the stator rotatably mounted on the housing within a predetermined angle, a compact structure is obtained and the noise and vibration problems present in devices of the prior art, are avoided with this arrangement of the present invention.

As is apparent from the above description, in the small synchronous motor of the invention, the rotor is rotatably mounted on the output shaft, and after the synchronous rotation of the rotor has been attained with no load, the torque of the rotor is transmitted to the output shaft, so as to produce a large torque at rated speed from the starting of rotation of the output shaft. This is achieved in spite of the small size of the motor.

Furthermore, since the no-load operation of the motor is carried out only for the time in which the rotor turns one revolution as a maximum in each of the forward and reverse directions, the starting operation of the motor can be accomplished within a very short period of time.

In addition, from a mechanical viewpoint, the above-described specific features of the small synchronous motor are obtained by the simple combination of the synchronous motor provided with a rotor having comb-tooth shaped magnetic poles and a directional torque-transmitting mechanism comprising the engaging pawl, the locking member and the torque transmitting plate.

Accordingly, the small synchronous motor according to the invention is simple in construction and can be produced at low cost.

I claim:
1. A small synchronous motor comprising:
   a. a housing;
   b. a stator having a stator magnet;
   c. an output shaft;
   d. a rotor rotatably mounted on the output shaft in a manner whereby the rotor is rotatable through a predetermined angle around and relative to the output shaft; and
   e. a torque transmitting mechanism for transmitting torque from the rotor to the output shaft,
   the synchronous motor being started upon application of electric power thereto, first, by a rotation of the rotor to its synchronous speed under no load, and, then, a rotation of the output shaft by the torque thus transmitted from the rotor by said torque transmitting mechanism, said stator being rotatably mounted on said housing with a predetermined angle around said output shaft, said stator having an engaging member which can engage with another engaging member of the rotor directly after the start of the rotor.

* * * * *